| United States Patent [19] | [11] 3,970,721 |
|---|---|
| Brockington et al. | [45] July 20, 1976 |

[54] ALKYLATION PROCESS FOR PRODUCTION OF MOTOR FUELS UTILIZING SULFURIC ACID CATALYST WITH TRIFLUOROMETHANE SULFONIC ACID

[75] Inventors: James W. Brockington; Richard H. Bennett, both of Richmond, Va.

[73] Assignee: Texaco Inc., New York, N.Y.

[22] Filed: Mar. 24, 1975

[21] Appl. No.: 561,401

[52] U.S. Cl. .......................................... 260/683.63
[51] Int. Cl.² ........................................... C07C 3/54
[58] Field of Search ............. 260/683.63, 683.59, 260/683.58, 683.47

[56] References Cited
UNITED STATES PATENTS

| 3,231,633 | 1/1966 | Kramer | 260/683.63 |
| 3,778,489 | 12/1973 | Parker et al. | 260/683.47 |
| 3,887,635 | 6/1975 | Parker et al. | 260/683.47 |
| 3,922,319 | 11/1975 | Brockington | 260/683.63 |

*Primary Examiner*—G. J. Crasanakis
*Attorney, Agent, or Firm*—T. H. Whaley; C. G. Ries; Douglas H. May, Jr.

[57] ABSTRACT

A liquid phase alkylation process for production of alkylate useful as motor fuel, wherein low molecular weight isoparaffin hydrocarbons are alkylated with olefin hydrocarbons in the presence of a catalyst, comprising a mixture of a major portion of sulfuric acid ($H_2SO_4$) with a minor portion of trifluoromethane sulfonic acid ($CF_3SO_3H$) which may contain about 0–3 weight percent water and about 0–10 weight percent acid oils.

7 Claims, No Drawings

3,970,721

ALKYLATION PROCESS FOR PRODUCTION OF MOTOR FUELS UTILIZING SULFURIC ACID CATALYST WITH TRIFLUOROMETHANE SULFONIC ACID

This application is related to U.S. Patent application, Ser. No. 520,595, filed Nov. 4, 1974, now U.S. Pat. No. 3,922,319.

BACKGROUND OF THE INVENTION

1. Field of the Invention

The present invention relates to liquid phase, acid catalyzed alkylation of isoparaffin hydrocarbon with olefin hydrocarbon for production of alkylate having high octane value and being suitable for gasoline blending stock. More particularly, the present invention relates to such an alkylation process wherein improved acid catalyst comprising a selected ratio of trifluoromethane sulfonic acid with sulfuric acid is employed.

2. Description of the Prior Art

Liquid phase alkylation processes wherein isoparaffin hydrocarbons, such as isobutane, etc. are alkylated with olefin hydrocarbons such as propylene, butylenes, etc. for production of alkylate products comprising highly branched $C_7$-$C_8$ range paraffin hydrocarbons having high octane values, are well known and widely practiced. In such alkylation processes, reactant hydrocarbons are generally contacted in the liquid phase, at temperatures in the range of from about 0°–100°F, in the presence of acid alkylation catalysts under conditions of good mixing to produce the desired alkylate hydrocarbons. Reaction pressures, which may vary from about ambient to superatmospheric, are sufficient to maintain reactants in the liquid phase. Higher pressures than that required to maintain reactants in the liquid phase apparently have no substantial effect upon such alkylation reactions. Acid catalysts may be selected from a wide range of strong acids including sulfuric acid and fluorosulfonic acid. Generally, liquid alkylation catalysts such as sulfuric acid, trifluoromethane sulfonic acid and fluorosulfonic acid are substantially immiscible with isoparaffin hydrocarbon reactants. Consequently, reactant hydrocarbons and liquid alkylation catalysts are contacted in an alkylation zone under conditions of high shear mixing sufficient to form an emulsion of immiscible hydrocarbon and catalyst. Detailed description of such alkylation processes is not required herein, as such processes are well known and widely practiced in the prior art.

In such alkylation processes side reactions take place in addition to desired alkylation reactions wherein 1:1 olefin-isoparaffin adducts are produced. For example, olefin hydrocarbons tend to polymerize in the presence of strong acid catalysts to form $C_{12}$ and higher molecular weight polymers; also such polymers tend to crack in the presence of the strong acid catalyst forming low octane $C_5$-$C_7$ hydrocarbons. These side reaction products, e.g., olefin polymers and cracked products, have relatively low octane values and are not as desirable as the 1:1 olefin isoparaffin alkylation products for use as gasoline blending stocks.

In order to maximize the yield of the desired alkylate products at the expense of the undesired side reaction products, care is taken to insure good contact of isoparaffin reactants with olefin reactants in the presence of alkylation catalysts under reaction conditions which favor formation of alkylate hydrocarbon products over side reaction products. For example, reaction temperatures are maintained in the range of about 0°F to about 100°F wherein the alkylation of isoparaffins with olefins proceeds at economically attractive rates and wherein olefin polymerization rates are not so great as to consume excessive amounts of olefin reactant. Further, a substantially stoichiometric excess of isoparaffins over that required to react with olefin is employed to insure contact of isoparaffins with olefins under alkylation reaction conditions. Further, as olefin reactants are generally substantially more soluble in acid catalysts than are isoparaffin reactants, high-shear mixing of the alkylation reaction mixture is generally provided sufficient to form emulsions of acid catalysts and hydrocarbon reactants. Formation of such emulsions increases the contact area between acid catalyst, containing dissolved olefins with isoparaffin hydrocarbons, thus materially improving yield and quality of alkylate product.

Commonly, where sulfuric acid is the selected acid catalyst, the alkylation reaction emulsion is one wherein isoparaffin hydrocarbon is emulsified in a continuous acid phase, although it is known to employ reaction emulsions comprising acid catalyst phase suspended in a continuous isoparaffin hydrocarbon phase. Alkylation reaction mixtures comprising about 40–70 volume percent sulfuric acid catalyst and about 60–30 volume percent hydrocarbon phase are known to form emulsions wherein the acid phase is continuous.

It is well-known that sulfuric acid is a particularly effective catalyst for the alkylation of isoparaffin hydrocarbon with olefin hydrocarbon. Additionally, it is known that sulfonic acids, including fluorosulfonic ($HFSO_3$), trifluoromethane sulfonic ($CF_3SO_3H$) chlorosulfonic, and various organic sulfonic acids are effective alkylation catalysts used alone or in admixture with other strong acids. For example see: U.S. Pat. No. 3,708,533, Olah, which teaches alkylation of paraffins with olefins in a reaction catalyzed by a mixture of Lewis acid (e.g. $SbF_5$) and a Bronsted acid (e.g. $CF_3SO_3H$); U.S. Pat. No. 2,313,103 which teaches alkylation of an isoparaffin with an olefin hydrocarbon employing fluorosulfonic acid as catalyst is superior to alkylation reactions employing $H_2SO_4$ catalyst; U.S. Pat. No. 3,231,633 wherein it is taught that the catalytic activity of fluorosulfonic acid is improved by addition of a minor amount of $H_2SO_4$ (e.g. not less than 50 weight percent $HFSO_3$ in the catalyst mixture); U.S. Pat. No. 2,259,723, Ballard et al, which teaches the use of chlorosulfonic and fluorosulfonic acids in admixture with hydrogen halides; U.S. Pat. No. 3,766,293, Parker et al which teaches the use of "fluorosulfuric" acid in combination with a minor amount of catalyst promoter which may include sulfuric acid; U.S. Pat. 3,231,633, Kramer, which teaches an alkylation process employing fluorosulfonic acid in combination with up to about 50 weight percent sulfuric acid; and U.S. Pat. No. 2,425,572, Slotterbeck, which teaches an alkylation process wherein a minor portion (1–10%) of chlorosulfonic acid or other substituted sulfonic acids, such as aliphatic sulfonic acids, are added to the sulfuric acid alkylation catalyst.

Trifluoromethane sulfonic acid, as well as other sulfonic acids, is relatively expensive compared to sulfuric acid. Thus, one of the major disadvantages of using trifluoromethane sulfonic acid, or other sulfuric acids, as alkylation catalyst is high cost of these acids. In alkylation reactions, acid catalyst is consumed at rates ranging from about 0.1 up to about 1.0 or more pounds of catalyst per gallon of alkylate product as a result of side reactions such as hydrolysis and reactions with olefin hydrocarbons. Consequently, the expense of providing sulfonic acids as the major components of alkylation catalysts is generally prohibitively expensive in commercial alkylation processes.

SUMMARY OF THE INVENTION

Now, according to the present invention, we have discovered an improved alkylation process wherein $C_4$-$C_6$ isoparaffin hydrocarbons are alkylated with $C_3$-$C_5$ olefin hydrocarbons in the presence of a novel alkylation catalyst comprising a major portion sulfuric acid and a minor portion trifluoromethane sulfonic acid, and which may contain about 0–3 weight percent water and about 0–10 weight percent acid oils.

In a preferred embodiment, an isoparaffin hydrocarbon such as isobutane is contacted with olefin hydrocarbons such as propylene, butylenes, and mixtures thereof in a molar ratio of isoparaffin to olefin of from about 2:1 to 20:1 in the liquid phase, in the presence of an alkylation catalyst comprising trifluoromethane sulfonic acid and $H_2SO_4$ in a weight ratio of 0.166 to 1 at a temperature in the range from about 0°F to about 100°F for production of alkylate hydrocarbon product having high octane value and being suitable for use in gasoline motor fuel. Preferably, the alkylation reaction mixture is subjected to good mixing to form a hydrocarbon in continuous acid phase emulsion which comprises from about 40 to about 70 volume percent acid phase and from about 60–30 percent hydrocarbon phase. Residence time of reactant hydrocarbons in the presence of acid catalyst under alkylation reaction conditions is preferably such that olefin space velocity is in the range of about 0.1 to about 1.0 volumes olefin per hour per volume of catalyst.

Advantages of the present invention include alkylate products of increased octane values compared to alkylation reactions employing $H_2SO_4$ catalyst alone. Additionally, by employing the improved catalyst of the present invention, corrosion of steel and stainless steel is substantially reduced, compared to acid catalysts comprising mixtures of $HFSO_3$ and $H_2SO_4$. These, and other advantages will be discussed in the detailed description which follows.

DETAILED DESCRIPTION OF THE INVENTION

The improvement of the present invention comprises use of a novel alkylation catalyst in processes for alkylating $C_4$-$C_6$ isoparaffin hydrocarbons with $C_3$-$C_5$ olefin hydrocarbons for production of high octane alkylate products suitable for use in blending of gasoline motor fuel.

Now, according to the present invention, we have discovered an alkylation catalyst comprising sulfuric acid and trifluoromethane sulfonic acid which is effective for producing alkylate of increased octane value. And which is only as corrosive toward carbon steel as is $H_2SO_4$. The novel catalyst of the present invention comprises a major portion sulfuric acid in admixture with a minor portion comprises trifluoromethane sulfonic acid preferably in a weight ratio of trifluoromethane sulfonic acid to sulfuric acid of 0.166:1. Such catalyst may contain from about 0 to about 3 weight percent water and from about 0 to about 10 weight percent acid oils. The acid oils are relatively high molecular weight reaction products of sulfuric acid with hydrocarbons present in the alkylation process.

In addition to improved alkylate quality over alkylation reactions employing sulfuric acid alone as catalyst, the catalyst mixture of the present invention is substantially less corrosive to steel and stainless steel equipment than are the $H_2SO_4$-$HFSO_3$ catalyst mixtures disclosed in U.S. Patent Application, Ser. No. 520,595, filed Nov. 4, 1974. The acid catalyst of this invention may contain from about 1 to about 3% water without being seriously deactivated. As the catalyst of the present invention may contain substantial amounts of water without seriously affecting catalytic activity, such fresh catalyst may be conveniently formulated with commercially available sulfuric acid of about 99.5–98 weight percent purity.

Trifluoromethane sulfonic acid, having the chemical formula $CF_3SO_3H$, which may be used in the practice of the present invention need not be completely pure. Commercial grades of trifluoromethane sulfonic acid having purities of about 99 weight percent may be used to formulate the catalyst of the present invention.

Sulfuric acid which is useful in formulating the fresh catalyst of the present invention is concentrated sulfuric acid, preferably about 99.5–98 weight percent $H_2SO_4$ and containing about 0.5–2 weight percent water.

Alkylation processes contemplated in the present invention are those liquid phase processes wherein isoparaffin hydrocarbons such as isobutane, isopentane, isohexane, etc. are alkylated with mono-olefins hydrocarbons such as propylene, butylenes, pentylenes, etc. for production of high octane alkylate hydrocarbons boiling in the gasoline range and which are suitable for use in gasoline motor fuel. Preferably, isobutane is selected as the isoparaffin reactant and olefin reactant is selected from propylene, butylenes, and mixtures thereof for production of an alkylate hydrocarbon product comprising a major portion of highly branched aliphatic $C_8$ hydrocarbons having high octane value. Such olefin reactants in the presence of strong acids and particularly sulfuric acid, tend to undergo undesirable alkylation reactions with isoparaffin hydrocarbons. In order to increase selectivity of olefin hydrocarbon conversion for alkylation with isoparaffin hydrocarbon, a substantial stoichiometric excess of isoparaffin hydrocarbon is desirable in the reaction zone. Liquid volume ratios of isoparaffin hydrocarbon to olefin hydrocarbon of from about 2:1 about 20:1 are contemplated in the present invention. Isoparaffin and olefin reactant hydrocarbons normally employed in commercial alkylation processes are derived from refinery process streams and usually contain small amounts of impurities such as normal butane, propane, etc. Such impurities are undesirable in large concentration as they dilute reactants in the reaction zone, thus decreasing reactor capacity available for the desired reactants and interferring with good contact of isoparaffin with olefin reactants. Additionally, in continuous alkylation processes wherein excess isoparaffin hydrocarbon is recovered from an alkylation reaction effluent and recycled for contact with additional olefin hydrocarbon, such nonreactive normal paraffin impurities tend to accumulate in the alkylation system. Consequently, process charge streams and/or recycle streams which contain substantial amounts of normal paraffin impurities are usually fractionated to remove such impurities and maintain their concentration at a low level, preferably less than about 5%, in the alkylation process.

Alkylation reaction temperatures within the contemplation of the present invention are in the range of from about 0°F to about 100°F. Lower temperatures favor alkylation reaction of isoparaffin with olefin over competing olefin side reactions such as polymerization. However, overall reaction rates decreases with decreasing temperatures. Temperatures within the given range, and preferably in the range from about 40°F to about 70°F, provide good selectivity for alkylation of isoparaffin with olefin at commercially attractive reaction rates.

Reaction pressures contemplated in the present invention are sufficient to maintain reactants in the liquid phase and may range from ambient to superatmospheric. Reactant hydrocarbons may be normally gaseous at alkylation reaction temperatures, thus reaction pressures in the range of about 10–150 psig are preferred. With all reactants in the liquid phase, increased pressure has no significant effect upon the alkylation reaction.

Contact times for hydrocarbon reactants in an alkylation zone, in the presence of the alkylation catalyst of the present invention may range from about 0.5 to about 60 minutes. Preferably, contact time is sufficient for essentially complete conversion of olefin reactant in the alkylation zone. In the alkylation process of the present invention, employing isoparaffin and olefin reactants in volume ratios in the range of 2:1 to 20:1, wherein the alkylation reaction mixture comprises about 40–70 volume percent acid catalyst phase and about 60–30 volume percent hydrocarbon phase, and wherein good contact of olefin with isoparaffin is maintained in the reaction zone, essentially complete conversion of olefin may be obtained at olefin space velocities in the range of about 0.1 to 1 volume olefin per hour per volume catalyst (v/v/hr.). Optimum space velocities will depend upon isoparaffin and olefin reactants, the particular compositions of alkylation catalyst, and alkylation reaction conditions. Consequently, the preferred contact times are sufficient for providing an olefin space velocity in the range of 0.1 to 1 (v/v/hr) and allowing essentially complete conversion of olefin reactant in the alkylation zone.

Batch or continuous methods of operation may be used. Different procedures, which may vary with the method of operation, may be used for ensuring the presence of acid catalyst having the desired acidity and ratio of $H_2SO_4$ to $CF_3SO_3H$ in the reaction mixture. Thus, in batch operations, acid catalyst having the desired ratio of $H_2SO_4$ to $CF_3SO_3H$ may be added with isoparaffin to a reaction vessel. Olefin reactants can then be added at a desired rate to the reaction mixture for a time until acidity of the acid catalyst declines, or until a substantial portion of the isoparaffin reactant is consumed.

In a continuous process, isoparaffin and acid catalyst are continuously charged separately to an alkylation zone maintained at alkylation reaction conditions. Olefin hydrocarbon may be separated charged, or may be added in admixture with the isoparaffin at a rate to maintain the desired olefin space velocity in the alkylation zone. Reaction effluent is continuously removed from the alkylation zone and separated into an acid phase and a hydrocarbon phase comprising unreacted isoparaffin and alkylated hydrocarbon. A portion of the separated acid phase is recycled for contact with additional hydrocarbon reactants. Preferably, the recycled acid phase contains from 5 to 30 volume percent hydrocarbon for improving contact of isoparaffin with olefin in the presence of the acid catalyst. A portion of the acid phase may be continuously or intermittently withdrawn from the process for removal of water and acid oil impurities. Fresh acid catalyst, comprising $H_2SO_4$ and $CF_3SO_3H$ in the selected ratio and having high acidity is added to make up for the acid phase withdrawn, thereby maintaining the acidity of the acid catalyst in the alkylation zone within the desired range of acidity. The separated hydrocarbon phase may be fractionated in a fractionation zone into an alkylate fraction and an unreacted isoparaffin fraction. Additionally, hydrocarbon impurities, such as normal paraffins, may be fractionated from isoparaffins in the fractionation zone. Preferably, fractional distillation methods are employed to fractionate the separated hydrocarbon phase. The isoparaffin fraction may be recycled to the alkylation zone for contact with additional reactants.

The desired agitation of the reaction mixture, for insuring good contact of isoparaffin with olefin in the presence of alkylation catalyst, may be provided in a number of ways. For instance, mechanical mixers may be used for forming a reaction emulsion of hydrocarbon and acid catalyst in the alkylation zone. Additionally, charge and recycle streams may be charged through nozzles or jets into the reaction zone for providing the desired agitation. These, and other methods for obtaining good liquid-liquid mixing in the alkylation zone may be used advantageously in the method of the present invention.

The following examples demonstrate the advantages of the present invention. These examples are by way of illustration only, and are not intended as limitations upon the invention as set out in the appended claims.

EXAMPLE I

A series of continuous alkylation runs was performed in the liquid phase, at about 50°F, employing as reactant charge stocks a petroleum refinery butylene stream, C.P. grade propylene and technical grade isobutane. The purpose of these runs was to compare alkylation reactions employing sulfuric acid catalyst, $H_2SO_4$-$HFSO_3$ mixed acid catalyst and $H_2SO_4$-$CF_3SO_3H$ mixed acid catalysts of the present invention. In all these alkylation runs, acid catalyst and reactant hydrocarbons were contacted in a carbon steel alkylation reactor with mechanical mixing to form a reaction emulsion. Reaction emulsion was continuously withdrawn and separated by gravity settling, into a catalyst phase and a hydrocarbon phase. Separated catalyst phase was recycled to the alkylation reaction for contact with additional reactant hydrocarbons.

For alkylation runs employing $H_2SO_4$ catalyst, fresh catalyst makeup was 97.9% $H_2SO_4$ containing about 2.1% water. For alkylation runs employing $H_2SO_4$-$HFSO_4$ mixed acid catalyst, fresh catalyst comprised 14.3 weight percent $HFSO_3$, 83.9 weight percent $H_2SO_4$, and 1.8 weight percent $H_2O$, which results in a fresh catalyst having 0.172:1 weight ratio of fluorosulfonic acid to sulfuric acid and titratable acidity of 21.53 meg/gm. For alkylation runs employing the $H_2SO_4$-$CF_3SO_3H$ mixed catalyst of the present invention, fresh catalyst comprised 14.0 wt.%, $CF_3SO_3H$, 84.2 wt.% $H_2SO_4$, and 1.8 wt.% $H_2O$ which results in a fresh catalyst having 0.166/1 weight ratio of $CF_3SO_3H$ to $H_2SO_4$ and a calculated titratable acidity of 18.1 meg/gm.

Operating conditions and results of this first series of alkylation runs, are set out in Table 1 below. Butylene space velocities (volume olefin per hour per volume catalyst) were maintained relatively constant, as were reaction temperatures and isobutane-to-butylene volume ratios.

TABLE 1

| Run No. | Temp. °F | Catalyst Type | Olefin | Olefin Space velocity v/v/hr | Isoparaffin/olefin weight ratio | Alkylate Octane RON-CLEAR |
|---|---|---|---|---|---|---|
| 1 | 50° | $CF_3SO_3H$-$H_2SO_4$ | Butylene | 0.53 | 5.12/1 | 96.6 |
| 2 | 50° | $CF_3SO_3H$ | Butylene | 0.21 | 6.82/1 | 89–93.7 |
| 3 | 50° | $H_2SO_4$ | Butylene | 0.43 | 5.12/1 | 95.8 |
| 4 | 50° | $HFSO_3$-$H_2SO_4$ | Butylene | 0.52 | 5.12/1 | 96.7 |

From Table 1, comparison of Run 1 with Runs 2 and 3, all made with butylene as olefin charge stock, demonstrates the $CF_3SO_3H$-$H_2SO_4$ mixed acid of the present invention produces alkylate of higher octane value than the alkylate product obtained from alkylation reactions employing either $CF_3SO_3H$ or $H_2SO_4$ alone as catalyst. Comparison of Run 1 with Run 4 demonstrates the catalytic activity of the $CF_3SO_3H$-$H_2SO_4$ mixture of the present invention is about equivalent to catalytic activity of a $HFSO_3$-$H_2SO_4$ mixed catalyst.

Thus, the mixed $CF_3SO_3H$-$H_2SO_4$ catalyst produces higher octane alkylate than conventional $H_2SO_4$ catalyst.

EXAMPLE II

Spent acid catalysts from Runs 1, 3 and 4 of Example I, table 1 each of which contained stainless steel corrosion coupons were recovered free of entrained hydrocarbon and were analyzed by atomic absorption spectroscopy for iron, chromium, and nickel. The relative amounts of these metals for each run is proportional to the severity of corrosion of the carbon steel reactor and the stainless steel corrosion coupons by the respective acid catalyst system. Data from these analyses are shown in Table 2.

TABLE 2

| Alkylation Run | Composition Spent Catalyst | Spent Catalyst Metals | | |
|---|---|---|---|---|
| | | Iron wt.ppm | Nickel wt.ppm | Chromium wt.ppm |
| 1 | $CF_3SO_3H$-$H_2SO_4$ | 169 | <10 | 68 |
| 3 | $H_2SO_4$ | 144 | <10 | 29 |
| 4 | $HFSO_3$-$H_2SO_4$ | 6700 | 165 | 365 |

From Table 2, it is seen that the amount of metals in the $CF_3SO_3H$-$H_2SO_4$ catalyst of the present invention is very close to the amount of metals in the $H_2SO_4$ catalyst, and is much less than the amount of metals found in the $HFSO_3$-$H_2SO_4$ catalyst. The $CF_3SO_3H$-$H_2SO_4$ catalyst is substantially less corrosive than the $HFSO_3$-$H_2SO_4$ catalyst, and is only about as corrosive as $H_2SO_4$ catalyst. It is well known in the petroleum refining industry that corrosion rates in the range shown for $H_2SO_4$ and $CF_3SO_3H$-$H_2SO_4$ catalysts, are tolerable in commercial alkylation processes, and that carbon steel vessesl, piping, and equipment may be used.

Thus, it is seen in Tables 1 and 2 that alkylate products of improved octane value over the $H_2SO_4$ catalyst may be obtained using the $CF_3SO_3H$-$H_2SO_4$ catalyst of the present invention, without the drawback of increased corrosion caused by the $HFSO_3$-$H_2SO_4$ catalyst. Additionally, by employing the catalyst of the present invention, comprising $CF_3SO_3H$ and $H_2SO_4$ in a weight ratio of about 0.166/1 the cost of the catalyst may be substantially reduced over costs of catalysts comprising a major portion of halosulfonic and/or substituted halo-sulfonic acids.

It will be apparent to those skilled in the art that many variations and modifications of the present invention, which has a principal feature the use of an acid catalyst comprising a minor portion $CF_3SO_3H$ and a major portion of $H_2SO_4$, preferably in a weight ratio of about 0.166/1 respectively in a process for alkylating isoparaffin hydrocarbon with olefin-hydrocarbons.

We claim:

1. In a liquid phase alkylation process for alkylating $C_4$-$C_6$ isoparaffins with $C_3$-$C_5$ mono-olefins to form alkylate hydrocarbon products; the improvement which comprises:
   contacting, in an alkylation zone, isoparaffin and olefin reactants with a catalyst comprising a minor portion $CF_3SO_3H$ and a major portion $H_2SO_4$, and containing about 0–3 weight percent water, and about 0–10 weight percent acid oils.

2. The method of claim 1 wherein said alkylation catalyst comprises $CF_3SO_3H$ and $H_2SO_4$ in a weight ratio of about 0.166/1.

3. In a liquid phase alkylation process for alkylating isobutane with olefin hydrocarbons selected from the group consisting of propylene, butylene, and mixtures thereof for production of alkylate hydrocarbons useful as gasoline blending stocks; the improvement which comprises:
   contacting, in an alkylation zone, isobutane with said olefin reactants in the presence of an alkylation catalyst comprising a minor portion $CF_3SO_3H$ and a major portion $H_2SO_4$ and containing about 0–3 weight percent water and about 0–10 weight percent acid oils.

4. The method of claim 3 wherein said alkylation catalyst comprises $CF_3SO_3H$ and $H_2SO_4$ in a weight ratio of about 0.166/1.

5. In a liquid phase alkylation process wherein isobutane is alkylated with olefin hydrocarbons selected from the group consisting of propylene, butylenes and mixtures thereof to form highly branched alkylate hydrocarbons suitable for use in gasoline, wherein isobutane and olefin reactants are contacted in a reaction zone, in a volume ratio of isobutane to olefin of from about 2/1 to about 20/1, at a temperature of from about 0°F to about 100°F, under mixing conditions, and in the presence of a strong acid alkylation catalyst such that the reaction mixture comprises about 40–60 volume percent hydrocarbon phase and 60–40 volume percent acid phase; the improvement which comprises:

contacting isobutane and said olefin reactants in the reaction zone at an olefin space velocity of from about 0.1 to about 1.0 volumes olefin per hour per volume catalyst with an acid catalyst comprising trifluoromethane sulfonic acid and sulfuric acid in a weight ratio of 0.166/1.

6. The method of claim 5 wherein a reaction effluent from the reaction zone is separated in a separation zone into a hydrocarbon phase comprising unreacted isoparaffin and alkylated hydrocarbon and into an acid phase, a major portion of said separated acid phase is recirculated to said reaction zone for contact with additional hydrocarbon reactants, a minor portion of said catalyst phase is withdrawn as spent catalyst for removal of impurities and reaction byproducts from the process, and the volume of acid catalyst in the alkylation process is maintained by addition of a fresh acid mixture comprising about 84.2 weight percent sulfuric acid, about 14.0 weight percent trifluoromethane sulfonic acid and about 1.8 weight percent water.

7. The process according to claim 6 wherein the olefin space velocity in the reaction zone is in the range of from about 0.17 to about 0.79 volumes olefin per hour per volume catalyst.

* * * * *